United States Patent [19] [11] 3,888,615
Ulmschneider et al. [45] June 10, 1975

[54] INJECTION MOLDING APPARATUS
[75] Inventors: Lawrence A. Ulmschneider; Edward H. Dowling, both of Rochester, N.Y.
[73] Assignee: Eastman Kodak Company, Rochester, N.Y.
[22] Filed: Jan. 4, 1974
[21] Appl. No.: 430,834

Related U.S. Application Data
[60] Division of Ser. No. 323,606, Jan. 15, 1973, Pat. No. 3,833,329, which is a continuation of Ser. No. 86,668, Nov. 4, 1970, abandoned.

[52] U.S. Cl.......................... 425/246; 425/DIG. 51
[51] Int. Cl.............................................. B29f 1/06
[58] Field of Search............ 425/242, 246, DIG. 51

[56] References Cited
UNITED STATES PATENTS
| | | | |
|---|---|---|---|
| 2,327,227 | 8/1943 | Tucker | 425/246 X |
| 3,071,814 | 1/1963 | Gugenheim | 425/DIG. 51 |
| 3,208,113 | 9/1965 | Bennett | 425/DIG. 51 |
| 3,293,691 | 12/1966 | Osgood | 425/246 X |

FOREIGN PATENTS OR APPLICATIONS
| | | | |
|---|---|---|---|
| 1,090,913 | 11/1967 | United Kingdom | 425/246 |
| 45-30,589 | 10/1970 | Japan | 425/246 |

Primary Examiner—Francis S. Husar
Assistant Examiner—David S. Safran
Attorney, Agent, or Firm—R. L. Randall

[57] ABSTRACT

Injection molding apparatus which comprises a rotatable rotor member having a plurality of mold assemblies disposed about the periphery thereof. Each mold assembly has an injection chamber and an openable mold cavity. Drive means is arranged to continuously rotate the rotor member and the mold assemblies. A stationary molten plastic supply means is disposed adjacent the periphery of the rotor member and is arranged to supply for example molten thermoplastic material to the injection chamber of a mold assembly as it is continuously moved past the supply means. Each mold assembly has an injection means arranged for movement into the injection chamber after the mold assembly has moved past the supply means to inject the molten thermoplastic material in the injection chamber into the mold cavity. Means is arranged to open each of the molds after the molten material injected therein has solidified, and to close the mold after removal of the solidified material therefrom and before the mold reaches the supply means. Conveyor means is also arranged to enter between the opened molds whereby the part may be removed with a predetermined orientation.

6 Claims, 11 Drawing Figures

INJECTION MOLDING APPARATUS

This is a division of application Ser. No. 323,606, filed Jan. 15, 1973, now U.S. Pat. No. 3,833,329, which is a continuation of application Ser. No. 86,668, filed Nov. 4, 1970, now abandoned.

BACKGROUND OF THE INVENTION

Injection molding of thermoplastic materials is widely used to produce a variety of parts. With this type of molding, complex parts having intricate shapes and requiring close dimensional tolerances can be produced. Moreover, a wide variety of materials have been successfully injection molded to form such parts.

Many forms of injection molding equipment have been developed, the most common of which utilize a stationary plastic extruder feeding through a series of runners to a plurality of mold cavities formed between a pair of separable mold dies. This apparatus includes means for clamping the dies together and for actuating the extruder to inject a "shot" of plastic into the runners and mold cavities. After the plastic has had sufficient time to solidify, the mold dies are separated and the parts ejected therefrom. Generally, when the parts are ejected from the mold dies, the runners and sprues associated therewith are also ejected. Thereafter, the solidified runner and sprue material must be separated from the molded parts and either reground and returned to the extruder or scrapped. At the same time, the separated parts must be collected and, if further assembly operations are to be performed, must be oriented before they have further operations performed thereon. While this procedure of separating the runners and sprues from the parts is costly and time consuming, it is necessary in order to achieve a reasonably high production rate from a single molding machine. Otherwise, it would only be possible to mold a single part between the mold dies, substantially reducing the production and economy of the machine. Even so, it will be appreciated that, at best, ejection molding equipment of this type is of an intermittent nature, utilizing a substantial portion of the molding cycle to solidify the plastic in the mold cavity before parts are ejected therefrom. As a result, the production and efficiency of such an ejection molding machine is less than what might otherwise be anticipated.

One attempt to simplify injection molding of thermoplastic parts has been the use of "hot runner" systems wherein the runners from the plastic extruder to the mold cavity are maintained at an elevated temperature. With this system, the plastic in the runners is maintained above the melting temperature with only the plastic in the mold cavity being solidified. Thus, only the parts are ejected from the mold cavity, with substantially no runners to remove therefrom. The step of removing the sprues and runners from the finished parts is substantially eliminated with this system. However, it has been found that hot runner molding has certain drawbacks prohibiting its utilization in the production of many types of parts. One of these drawbacks involves the heating of the runner area adjacent the mold cavity which prevents controlled and accurate cooling of the part in the mold cavity as it is solidified. As a result, it has been found that dimensional tolerances cannot be maintained in some parts due to the elevated temperature in the adjacent runner. Additionally, it has been found that certain materials, otherwise adaptable to injection molding, deteriorate when held at elevated temperatures for extended periods of time, as in the case of hot runner molding systems.

Other forms of injection molding apparatus have been developed in an attempt to solve the foregoing problems and to reduce the amount of "idle" time necessary for the parts to solidify in the mold cavity. One form of injection molding apparatus of this type utilizes a plurality of mold assemblies mounted on a rotating table which is intermittently moved past a plastic extruder. Alternatively, the mold assemblies have been arranged in a stationary circular arrangement with the extruder rotatably mounted in the center thereof. In either arrangement, as the mold assembly comes opposite the extruder nozzle, relative motion therebetween is stopped and the extruder nozzle is moved into operating contact with the inlet to the mold cavity and the shot of thermoplastic material is injected therein. The extrusion nozzle is then retracted from the cavity inlet and is moved to the next mold assembly. With molding apparatus of this type one ejection extruder can serve a multiplicity of mold assemblies thereby reducing the capital expense and permitting the extruder to operate more continuously by serially injecting plastic into a series of mold assemblies. In this manner, increased production rates are possible over apparatus in which it is necessary for the extruder to remain idle while the molded parts solidify within the mold cavities. However, it will be appreciated that apparatus which must be intermittently translated from one dwell position to the next is substantially more complex and costly than is the case if it is possible to operate the apparatus continuously. For example, the drive for such apparatus must comprise either a complicated and costly mechanical arrangement such as a Geneva drive, or sophisticated and expensive electrical, hydraulic, or pneumatic drive systems. As a result, equipment of this type incurs both greater initial costs and operating costs than is the case with apparatus which can be operated substantially continuously. In contrast, a constantly rotating turret or table, even though of great weight, may be driven through its endless cycle by a single, relatively simple power train powered by an electric motor which turns at a constant speed. While molding apparatus of this type has been developed previously for example note U.S. Pat. No. 2,915,957 and British Pat. No. 1,090,913, one problem with such known apparatus is that of maintaining close dimensional tolerances in the articles molded from such apparatus.

Accordingly, it will be appreciated that apparatus for injection molding thermoplastic material into complex parts having close dimensional tolerances at production rates higher than now possible would be extremely advantageous. Moreover, apparatus which is capable of operation continuously, without intermittent motion between the parts, would both simplify the arrangement and lessen the initial and the operating costs thereof. Still further, if the apparatus can mold parts with substantially no runners or sprues which must be separated from the parts after ejection, the apparatus would be even more advantageous. The apparatus would be even more desireable if it ejects the finished parts from the mold cavities in a predetermined orientation which can thereafter be maintained, significantly simplifying subsequent handling of the parts with a substantial resultant cost saving.

SUMMARY OF THE INVENTION

Accordingly, the present invention provides injection molding apparatus comprising a pair of separable mating die members with means arranged to inject a molten plastic material into the mold cavity between the closed die members to form a plastic part. Means is arranged to open the die members after the plastic part has solidified and conveyor means is arranged to enter between the opened die members. Means is also provided to eject the solidified plastic part from the die onto the conveyor means whereby the plastic part has a predetermined orientation on the conveyor means. Specifically, the die members are arranged to separate vertically with the conveyor means moving horizontally therebetween.

Also, the present invention provides injection molding apparatus comprising a pair of moving separable mating die members and a stationary means for supplying a molten plastic to the moving die members. Means is arranged to inject the molten plastic material into the mold cavity between the closed die members while the die members are moving. And means is arranged to open the die members transversely of the direction of continuous movement while they are moving after the plastic material has solidified.

Still further, the present invention provides a method of injection molding plastic parts comprising the steps of injecting a molten plastic material into a mold cavity between a pair of closed die members. The plastic part is solidified in the mold cavity and the die members are vertically opened after the plastic part has solidified. The plastic part is then ejected from the die onto a horizontally moving conveyor means passing between the opened die members whereby the plastic material has a predetermined orientation on the conveyor means.

The present invention also provides plastic injection molding apparatus which includes a pair of separable mating die members and means arranged to open and close the die members. An inlet opening communicates with the die cavity formed between the die members. Means is arranged to supply a molten plastic material to the die members, and means is provided for causing continuous relative movement between the die members and the plastic supply means. The plastic supply means includes a feed plenum disposed contiguous with the inlet opening to the die cavity, with the feed plenum having an outlet slot having a shape conforming to at least a portion of the path generated by the relative movement between the inlet opening and the feed plenum. The outlet slot is arranged to feed molten plastic into the die cavity opening as the die members and the supply means move past each other. The feed plenum has a single inlet opening and a plurality of flow paths therefrom to the outlet slot whereby substantially equal flow of plastic is delivered to the full length of the slot.

The present invention further provides continuous plastic injection molding apparatus comprising a plurality of mold assemblies each having a pair of separable mating die members with means arranged to selectively open and close the die members. Means forming an injection chamber is disposed in cooperating relationship with each pair of die members with the injection chamber opening through a sprue opening into the mold cavity formed between the die members and outwardly through an outer surface of the injection chamber forming means. Means is provided for supplying molten plastic to the injection chambers. Means is arranged to cause continuous relative movement between the mold assemblies with the injection chambers and the molten plastic supply means. Ram means is arranged to cooperate with each of the injection chambers to force plastic in the injection chamber into the mold cavity. Specifically, the injection ram means is arranged for vertical movement into and out of the injection chamber and to be spaced below the bottom surface of the injection chamber forming means. The molten plastic supply means is arranged to move in contact with the bottom surface of the injection chamber forming means between the bottom surface and the end of the injection ram.

More specifically, the present invention provides a continuous plastic injection molding apparatus comprising a stationary base member with a rotor member mounted thereon for horizontal rotation thereabout. A variable speed drive means is arranged to continuously rotate the rotor member. A plurality of mold assemblies are removably mounted contiguously about the outer periphery of the rotor member with each of the mold assemblies incorporating a substantially vertically disposed C-shaped assembly base member. A lower, vertically stationary mold member is mounted on the lower portion of the C-shaped assembly base member and has a female mold die disposed substantially horizontally on the top surface thereof. An upper, movable mold member is mounted on the upper portion of the C-shaped assembly base member and has a male mold die disposed substantially horizontally on the bottom surface thereof. The upper mold die is arranged to mate in molding engagement with the lower mold die to form a mold cavity. Part ejector means is disposed in the upper mold member. Hydraulic cylinder means is arranged to vertically lift the upper mold member from the lower mold member whereby the mold members are vertically spaced apart with substantially no alignment members extending therebetween. The upper mold lifting hydraulic cylinder means is operable after lifting the upper mold to actuate the part ejector means. Means forming an injection chamber is disposed beneath the lower mold member with the injection chamber opening upwardly through a sprue opening into the mold cavity and downwardly through the lower surface of the injection chamber forming means. A plastic extruder is disposed substantially perpendicular to the periphery of the rotor member and has a feed plenum for the plastic material disposed contiguous with the lower surface of the injection chamber forming means. The feed plenum has an arcuate outlet slot conforming to the path followed by the injection chamber opening in the lower surface of the injection chamber forming means with a length substantially equal to the distance between injection chamber openings in adjacent mold assemblies. The outlet slot is arranged to feed molten plastic into the injection chamber as the mold assembly moves past the feed plenum. The feed plenum has a single inlet opening connected to the outlet of the plastic extruder and a plurality of flow paths therefrom to the outlet slot whereby a substantially equal flow of plastic is delivered to the full length of the slot. The plastic extruder is pivotally supported about a vertical axis at the outer end thereof, whereby it can be moved horizontally to disengage the feed plenum from the lower surface of the injection chamber forming means, and about a horizontal axis at the outer end thereof with a vertically acting hydraulic cylinder connected at the inner end thereof to maintain the feed plenum outlet slot in contact with the lower surface of the injection chamber with a predetermined pressure regardless of vertical motion of that lower surface during rotation of the rotor member. Each of the mold assemblies includes a vertically movable injection ram mounted on the lower portion of the C-shaped assembly base member below the lower mold member which is arranged for movement into and out of the injection chamber. A hydraulic cylinder is disposed beneath the injection ram and is arranged to drive the ram upwardly to force thermoplastic in the injection chamber into the mold cavity and to withdraw the ram downwardly out of the injection chamber and to space the upper end of the ram from the lower surface of the injection chamber forming means. Upon withdrawal from the injection chamber the injection ram is arranged to remove the plastic remaining therein and means is arranged to remove the plastic from the injection ram after it is withdrawn from the injection chamber. A hydraulic fluid reservoir is disposed in the lower central portion of the stationary base member and a hydraulic fluid manifold is disposed on the inner periphery of the rotor member. Means is provided for communicating the manifold with each of the mold assemblies and the hydraulic cylinders thereon. Valve means cooperates with each of the hydraulic cylinders to control the flow of fluid from the manifold to the cylinders and pump means is arranged to receive hydraulic fluid from the reservoir and to supply it to the manifold. A stationary upper mold cylinder cam member is disposed about the periphery of the stationary base member. A stationary injection ram cylinder cam member is also disposed about the periphery of the stationary base member. Cam follower means is arranged with each of the valve means and cooperates with the respective cam members to selectively operate the hydraulic cylinders in response to the position of the mold assembly about the periphery of the base member. The cam members are arranged to cause the mold cavity to close and to space the upper end of the injection ram from the lower surface of the injection chamber before that mold assembly reaches the feed plenum and, after passing the feed plenum, to drive the injection ram upwardly into the injection chamber to force plastic therein into the mold cavity. The injection ram cam member is arranged to cause the ram to be withdrawn downwardly out of the injection chamber and to space the upper end thereof from the lower surface of the injection chamber forming means after a sufficient time to permit the plastic to solidify in the mold chamber. The upper mold cylinder cam member is then arranged to cause the upper mold member to be lifted, opening the mold cavity. A horizontally arranged conveyor means is disposed adjacent the molding apparatus and is arranged to extend between the open mold members. The conveyor means has a part receiving upper surface which has a path of movement substantially coincident with the path of movement of the mold assembly at the location where the conveyor means extends between the open mold members. The conveyor means is pivotally mounted at one end thereof whereby it is moved outward from between the mold members by the approach of a closed mold chamber. The upper mold cylinder cam member is arranged to cause a part to be ejected from the upper mold member directly downward onto the conveyor upper surface with a predetermined orientation thereon.

The various features of novelty which characterize the present invention are pointed out with particularity in the claims annexed to and forming a part of this specification. For a better understanding of the invention, its operating advantages and the specific objects obtained by its use, reference should be had to the accompanying drawings and descriptive matter in which a preferred embodiment of the present invention is illustrated and described.

DESCRIPTION OF A PREFERRED EMBODIMENT

Figure 1:
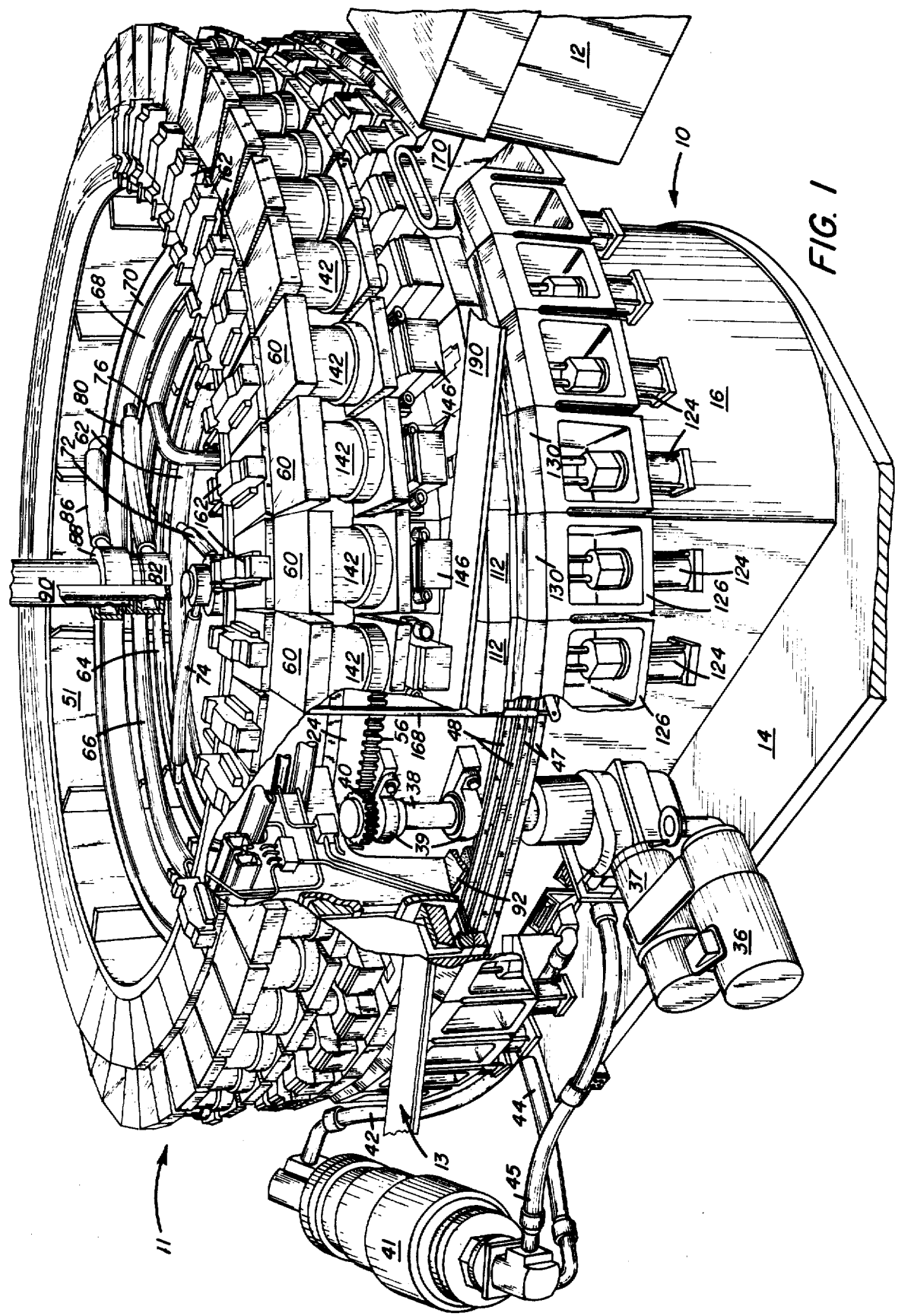
FIG. 1 is a perspective view, partially in section, of a preferred embodiment of an injection molding apparatus incorporating the present invention.
Figure 2:
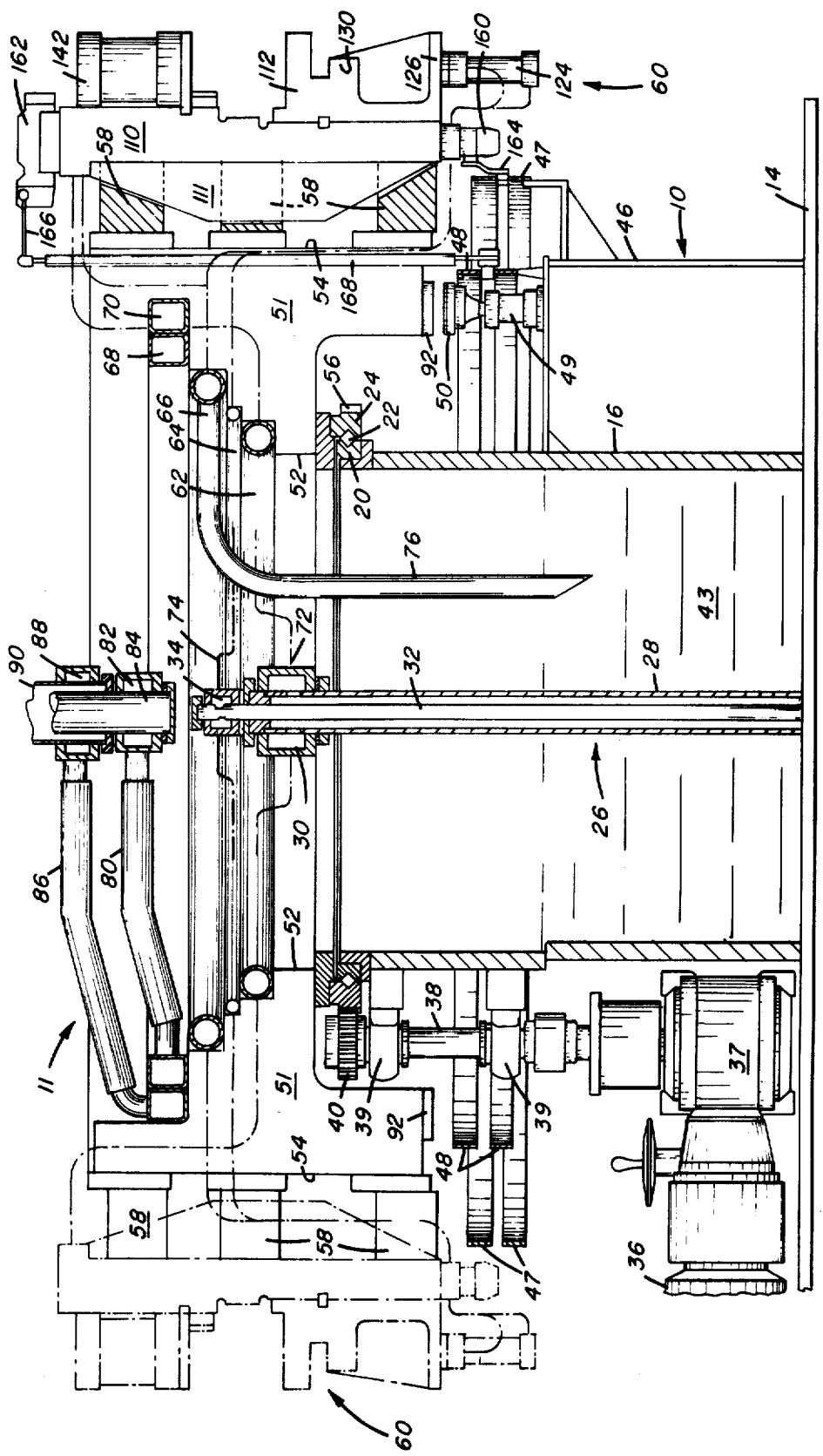
FIG. 2 is a vertical section of the injection molding apparatus illustrated in FIG. 1.
Figure 3:
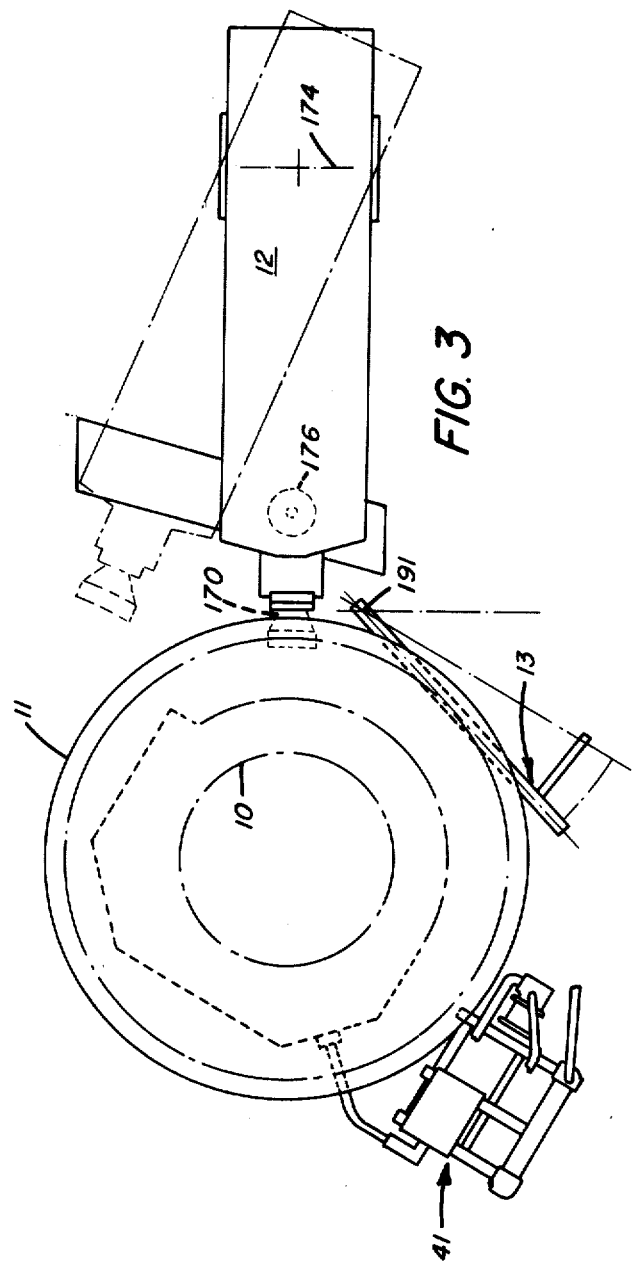
FIG. 3 is a plan view of the injection molding apparatus illustrated in FIG. 1.

Referring now to FIGS. 1, 2 and 3 for an overall view of the continuous injection molding apparatus of the present invention, it generally includes a stationary base assembly 10 and a movable rotor assembly 11 arranged for horizontal rotation about the base assembly. A thermoplastic extruder 12 is disposed adjacent the outer periphery of the rotor assembly 11 and is arranged to supply molten thermoplastic material to the die cavities carried by the rotor assembly, in a manner which is more thoroughly described hereinbelow. A finished part removal conveyor 13 is disposed substantially tangentially to the periphery of the rotor assembly and is arranged to receive the parts as they are ejected from the molds.

Base Assembly

The stationary base assembly is formed of a base plate 14 and a substantially vertical, generally cylindrical wall member 16 extending upwardly therefrom. An inner bearing ring 20 is supported at the upper end of the cylindrical wall member 16 and cooperates with bearing members 22, e.g. rollers or balls, which in turn mate with an outer bearing ring 24 on the inner periphery of the rotor assembly. A vertical standpipe 26 is arranged substantially in the center of the stationary base member and extends above the upper end of the cylindrical wall member 16. The standpipe is comprised of an outer pipe 28 communicating with a high pressure plenum chamber 30 at the upper end thereof, and a coaxial inner pipe 32 terminating in an intermediate pressure plenum 34 at the upper end thereof. Each of the plenums, 30 and 34, is arranged for rotation about the respective stationary pipes and are provided with the necessary rotary seals in a manner well-known in the art.

A rotor drive motor 36 is mounted on the base plate 14 outside of the cylindrical wall member 16 and is coupled through a variable speed transmission 37 to a vertically disposed drive shaft 38. The drive shaft is mounted to the outer surface of the cylindrical wall 16 of the stationary base assembly by bearing blocks 39 and is provided with a drive pinion 40 at the upper end thereof. A hydraulic pump 41 is also mounted on, or adjacent to, the base plate 14 and is arranged to receive a hydraulic fluid via line 42 from a reservoir 43 formed in the bottom of the base assembly, and to supply it at high and intermediate pressures via lines 44 and 45 to pipes 28 and 32, respectively, of the standpipe 26.

The base assembly is provided with a plurality of spaced support pedestals 46 which position and support circular, stationary cam members 47 and 48, which extend about the periphery of the base assembly. The cam members are preferably positive acting on the cam followers to assure that the required operations are performed as will be more thoroughly described hereinbelow. Rotor brake actuators, comprising a vertically acting hydraulic cylinder 49 and a brake pad 50, are also supported on the pedestals 46. The operation of the brake actuators is also described hereinbelow.

Rotor Assembly

The movable rotor assembly 11 comprises a substantially circular rotor member 51 which is preferably formed of a plurality of plates welded together into a substantially unitary structure having generally cylindrical inner and outer surfaces 52 and 54, respectively. The inner surface of the rotor member is disposed substantially co-extensive with the outer bearing ring 24 to which it is connected, thereby rotably supporting the rotor assembly on stationary base assembly 14 through bearing members 22. The outer periphery of the outer bearing ring 24 is provided with a plurality of teeth 56 forming a bull gear which engages and is driven by the drive pinion 40.

The outer peripheral surface 54 of the rotor assembly is provided with a plurality of radially outwardly extending mounting plates 58 to which the mold assemblies 60 are removably attached by means of a plurality of mounting bolts, not shown. Each mold assembly 60, which will be more completely described hereinafter, is mounted to the outer periphery of the rotor member in a manner which assures that mold assemblies are mounted equidistant from the rotor axis and at the same elevation from the apparatus base plate 14. Moreover, suitable adjusting means (not shown) is provided for each mold assembly so that any variations in the accuracy of the dimensions of the rotor member 51 or the individual mold assemblies may be accommodated.

The rotor member 51 is arranged to support and transport a plurality of substantially circular hydraulic manifolds 62, 64 and 66 disposed about the inner periphery thereof. Also, a pair of cooling fluid manifolds 68 and 70 are disposed about and supported by the inner periphery of the rotor member. Hydraulic manifold 62 is arranged to receive hydraulic fluid under high pressure from the high pressure plenum 30 via connecting lines 72, while manifold 64 receives an intermediate pressure hydraulic fluid from plenum 34 via lines 76. Manifold 66 is arranged to discharge the hydraulic fluid returning from the mold assemblies 60 to the hydraulic reservoir 43 formed in the bottom of the stationary base assembly via pipe 76. The cooling fluid inlet manifold 68 is connected via line 80 to a cooling fluid inlet plenum 82 which is arranged to rotate in a fluid-tight manner about a centrally disposed pipe 84 suspended over the standpipe 26 in the stationary base assembly. The cooling fluid outlet manifold 70 is connected via line 86 to an outlet plenum 88 which is arranged to rotate about a coaxial water outlet pipe 90 disposed coaxially about inlet pipe 84.

A horizontally disposed annular ring member 92 extends around the lower outer periphery of the rotor assembly 51 and forms a brake ring which is engaged by the brake pads 50 upon the actuation of the brake cylinders 49 to quickly bring the rotor assembly to a stop.

Mold Assembly

Referring now to FIGS. 4 through 7, an individual mold assembly 60 is illustrated in greater detail. The present injection molding apparatus is illustrated with 48 mold assemblies 60 disposed about the outer periphery of the rotor member 51. The mold assemblies are substantially identical so that a description of only one is sufficient for an understanding of the present invention.

Each mold assembly 60 comprises a generally C-shaped assembly base member 110 having a generally T-shaped horizontal cross-section. The centrally disposed vertical rib 111 on the rear face of the assembly base member adds strength and rigidity to the overall assembly and permits the components on the front face thereof to be cantilevered outward from the assembly base member without requiring vertical support members between the components at the outer peripheral face. Thus, free access may be had between the respective components from the outer periphery of the apparatus. As previously noted, the assembly base member is bolted to the outer faces of the mounting plates 58 while the rib 111 fits into the space provided between adjacent plates.

A horizontal lower stationary mold support table 112 is arranged substantially centrally of the vertical front face 113 of the base assembly and extends radially outward therefrom. The lower mold support table is arranged to locate and hold a stationary female mold die member 114 therein. The female mold die member is provided with a die cavity 116 in the horizontal upper surface thereof which is substantially co-planar with the upper surface of the support table. Two substantially cylindrical, vertically extending injection chambers 118 are formed in the lower portion of the female die member 114 and each communicate at the upper end thereof with the die cavity 116 through a sprue opening 120 of reduced cross-sectional area. The injection chambers open downwardly through the lower surface 122 of the die member 114 and have a uniform cross-section from the sprue openings to said lower surface 122. The injection chambers are preferably sized so that the combined capacity thereof is greater than the volume of plastic necessary to form the part.

Figure 4:
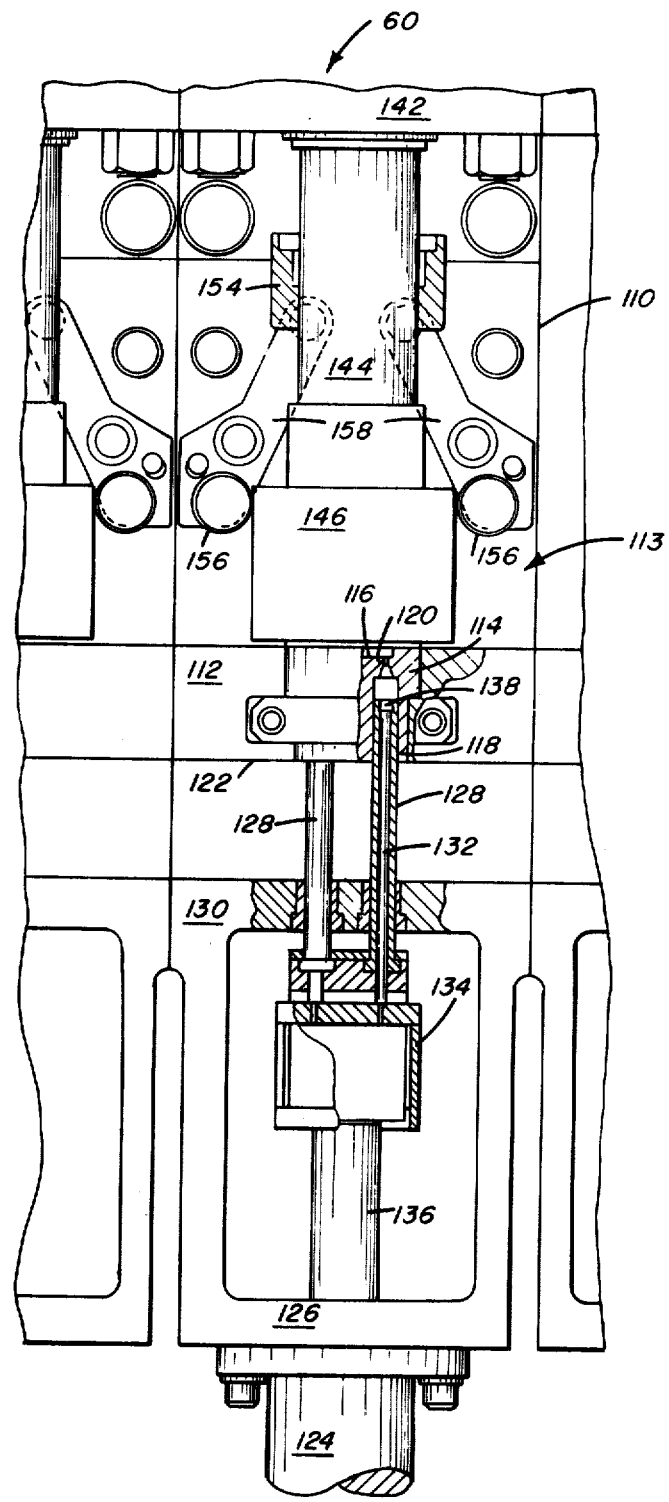
FIG. 4 is a front elevation view, partially in section, of a single mold assembly with the mold cavity closed.
Figure 5:
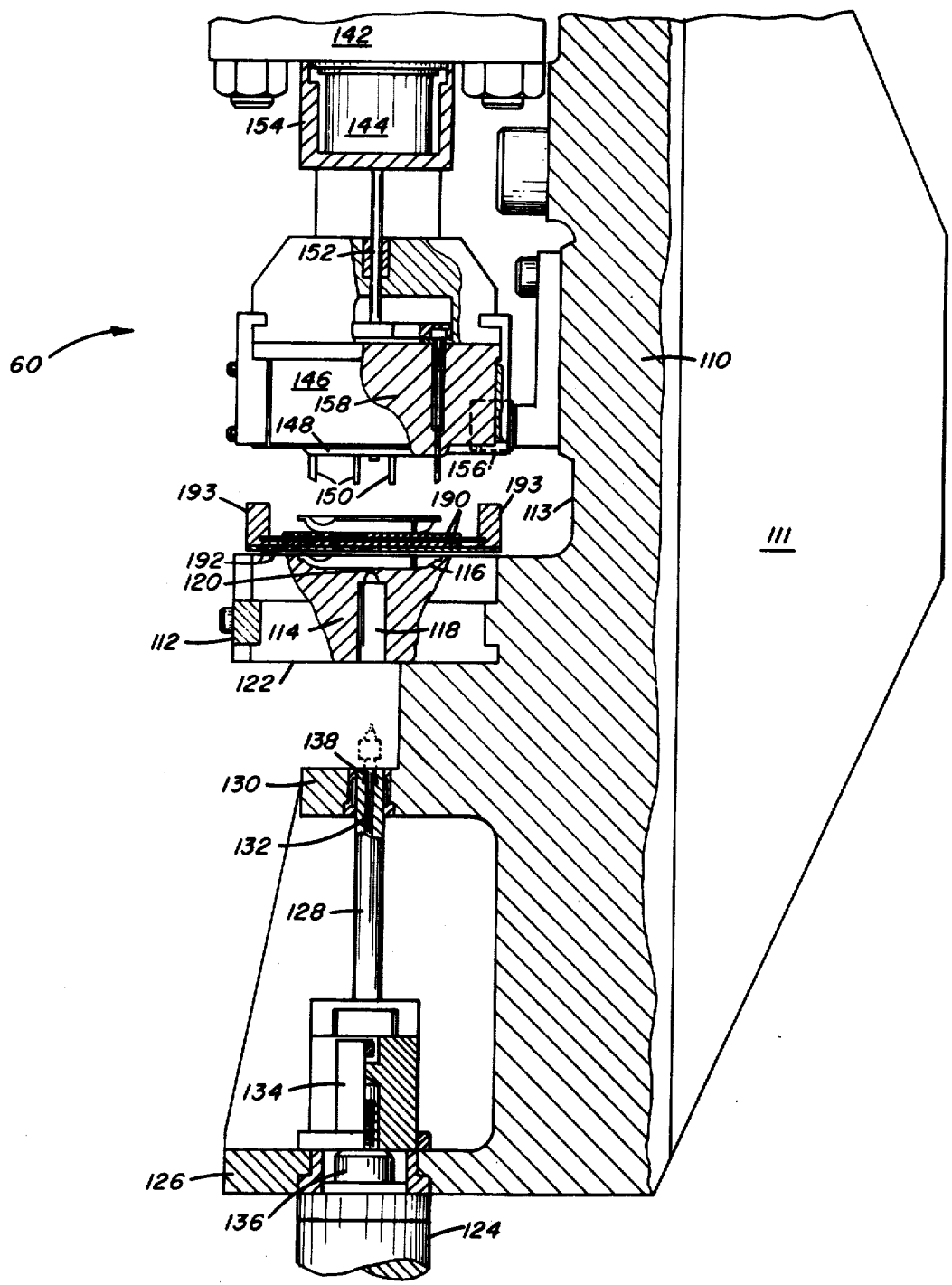
FIG. 5 is side elevation view, partially in section, of a single mold assembly with the mold cavity open.
Figure 6:
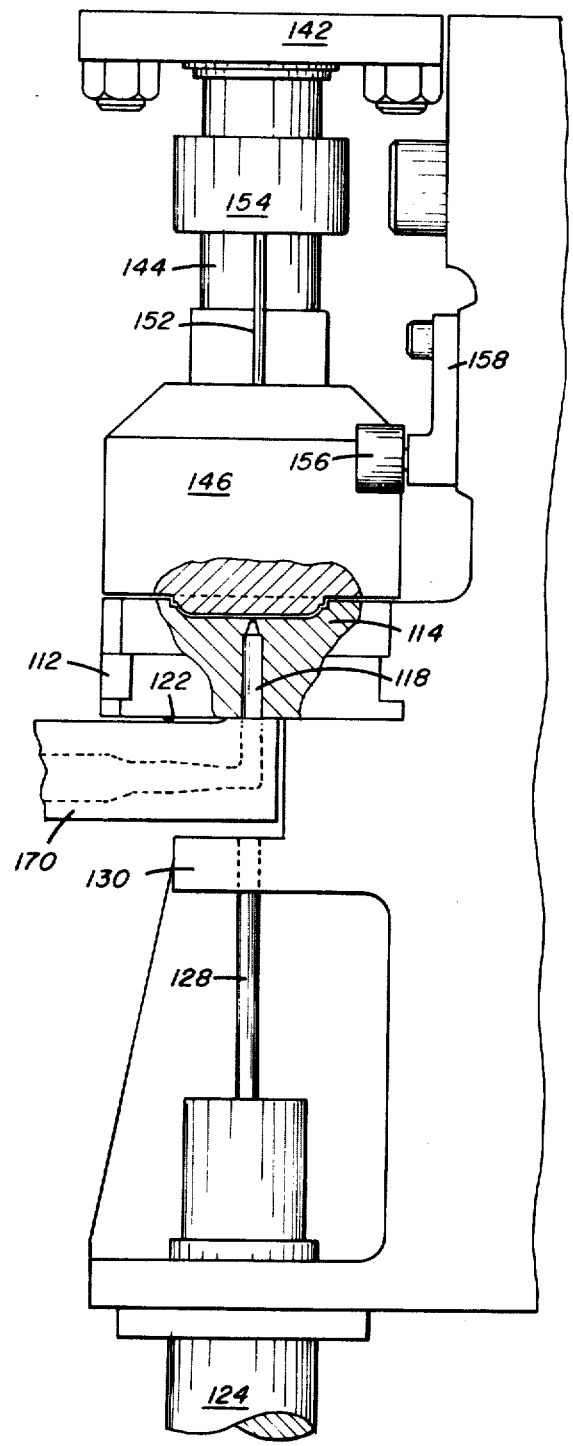
FIG. 6 is a side elevation view, partially in section, of a single mold assembly with the mold cavity closed.
Figure 7:
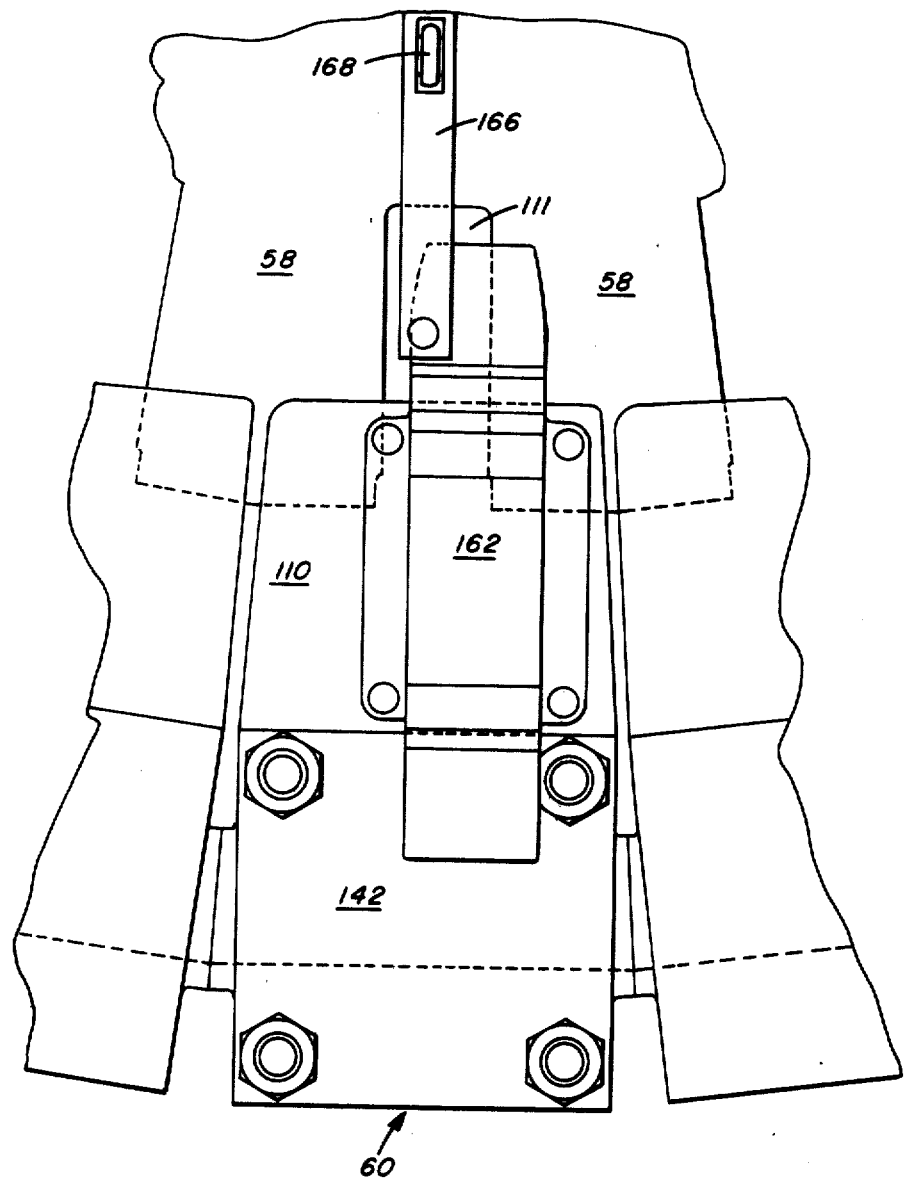
FIG. 7 is a plan view of a single mold assembly.

An injection ram-operating hydraulic cylinder 124 is vertically supported by a substantially horizontal platform 126 which extends outward from the front face 113 of the assembly base member 110 at the lower end thereof. The hydraulic cylinder 124 is connected to the lower ends of a pair of vertically movable injection rams 128 which are supported and guided by a bearing 130 which also extends outward from the front face of the assembly base member 110 between platform 126 and table 112. The injection rams have a cross-section substantially equal to the cross-section of the injection chambers. The rams are arranged to be moved vertically through the bearing 130 by the hydraulic cylinder 124 and are in vertical alignment with the injection chambers 118 so that, at the upper extremity of travel, the rams have a close fit therein, as illustrated in FIG. 4. When the injection rams are at the lower extremity of their travel, the upper ends thereof are spaced below the lower surface 122 of the lower die member 114, substantially level with the bearing 130, as illustrated in FIG. 5.

Each injection ram 128 is provided with an ejector pin 132 which extends axially therethrough. The lower ends of the ejector pins are connected to an actuating collar 134 carried by the upwardly extending piston shaft 136 of the ram-operating cylinder 124. The upper end of the ejector pin bore through the injection ram is provided with a reverse draw countersink 138 which engages the excess plastic remaining in the injection chamber after the mold cavity is filled so that the excess material is withdrawn from the injection chamber with the withdrawal of the injection ram. The upper end of the ejector pin 132 is normally spaced from the upper end of the injection ram at least the depth of the countersink. After the injection rams are withdrawn from the injection chamber the actuating collar 134 engages the upper surface of the platform 126 and stops the downward movement of pins 132 so that the excess material is released from the upper ends of the injection rams as they continue their downward movement.

A vertically operating upper mold lifting hydraulic cylinder 142 is supported at the top of the front face 113 of the assembly base member 110 and is connected via the downwardly extending piston shaft 144 to a movable upper mold member 146. A male mold die 148 is disposed substantially horizontally in the lower surface of the upper mold member and is arranged to mate in molding engagement with the lower mold die 114 to form a mold cavity therebetween. The upper mold member 146 is provided with a plurality of part-ejection pins 150 which are actuated by connecting rods 152 and collar member 154 which engages the lower surface of the hydraulic cylinder 142 to move the pins to eject the part as the mold is lifted by the cylinder, in a manner well-known in the art. The upper mold member 146 is aligned and guided in its travel between the closed and the opened positions by a pair of guide rollers 156 mounted, by means of eccentrically movable guide arms 158, to the front face 113 of the assembly base member 110. In this manner the mold members can be opened and closed accurately without requiring the use of guide pins which would extend between the mold members when they are open and would interfere with free access therebetween. The upper mold member 146 preferably contains the male die of the set of dies to simplify the retention of the finished part by the upper mold so that it can be ejected downwardly onto the conveyor.

Figure 10:
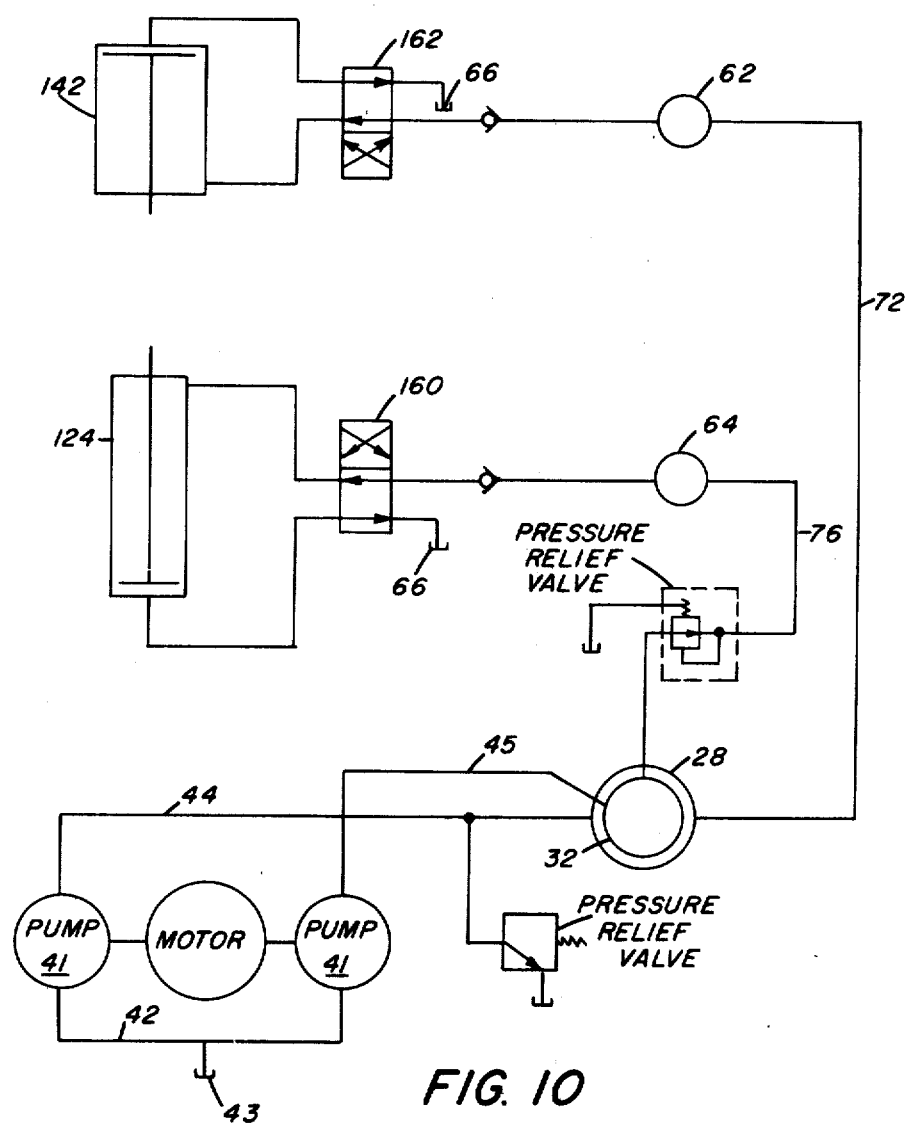
FIG. 10 is a schematic diagram of the hydraulic circuit for a single mold assembly.

As schematically illustrated in FIGS. 2 and 10, each mold assembly is provided with means connecting the injection ram operating hydraulic cylinder 124 through an operating valve 160 to the intermediate pressure manifold 64 and to the return manifold 66. Similarily, means is provided connecting the mold lifting hydraulic cylinder 142 through an operating valve 162 to the high pressure hydraulic manifold 62 and to the return manifold 66. The injection ram operating valve 160 has an operating lever 164 which engages and is actuated by the stationary cam member 47 as the mold assembly is rotated about the stationary base assembly. The operating lever 166 of the mold lifting cylinder operating valve 162 is actuated by a connecting rod 168 which engages and is actuated by the stationary cam member 48.

Each mold assembly is also provided with suitable coolant chambers (not shown) about the mold cavity which provide the necessary cooling to solidify the parts being formed therein and to maintain the mold assembly at the desired operating temperature in a manner well-known in the art. The coolant chambers are provided with suitable connections (not shown) to the coolant manifolds 68 and 70 on the inner periphery of the rotor spider member 51.

Extruder

The thermoplastic extruder 12 is arranged substantially perpendicular to the periphery of the rotor assembly 11 as shown in FIGS. 1 and 3. The extruder is preferably a heated, rotating screw-type extruder well-known in the art. The extruder outlet is connected to the inlet of a feed plenum 170 which is shown in detail in FIGS. 8 and 9 and which is described in further detail hereinbelow. The feed plenum 170 is arranged to extend between the bottom of the mold support table 112 and the bearing 130 for the injection rams 128 which are in the lowermost position as they pass the extruder. The feed plenum is held in sliding engagement with the lower surfaces 122 of the die members 114 and is arranged to supply molten thermoplastic to the injection chambers 118 as they are moved therepast.

The extruder 12 is mounted at the outer end for horizontal rotation about a vertical axis whereby it can be rotated away from engagement with the rotor assembly should the injection rams 128 of a mold assembly not be withdrawn, or should maintenance considerations so require. The extruder is also mounted at the outer end for vertical movement about a horizontal axis 174, which vertical movement is controlled by a vertically operating hydraulic cylinder 176 located under the inner end of the extruder. This vertical motion permits the extruder feed plenum 170 to mate in sliding engagement with the lower surface 122 of the die members 114 with a predetermined force, or with a small predetermined clearance, which assures that there is no leakage of the molten plastic at the interface between the feed plenum outlet and the lower surface of the die members. Moreover, the use of the vertically operating hydraulic cylinder 176 permits the accomodation of slight variations in the elevation of the lower surface of the die members as they move past the extruder without excessive leakage of molten plastic at the interface.

Figure 8:
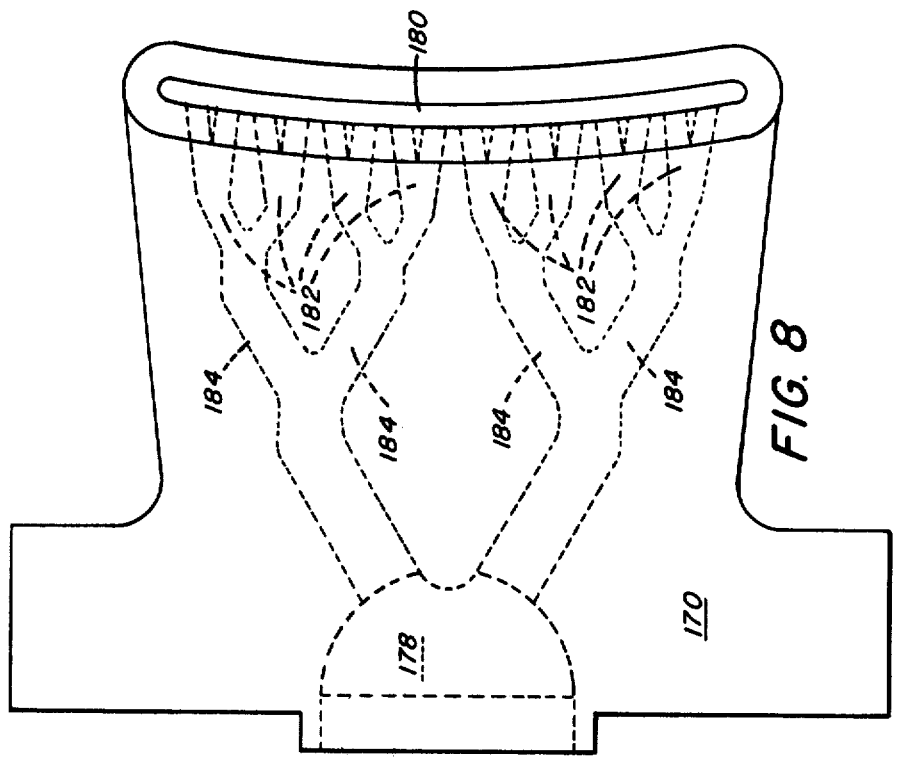
FIG. 8 is a plan view of the extruder nozzle.
Figure 9:
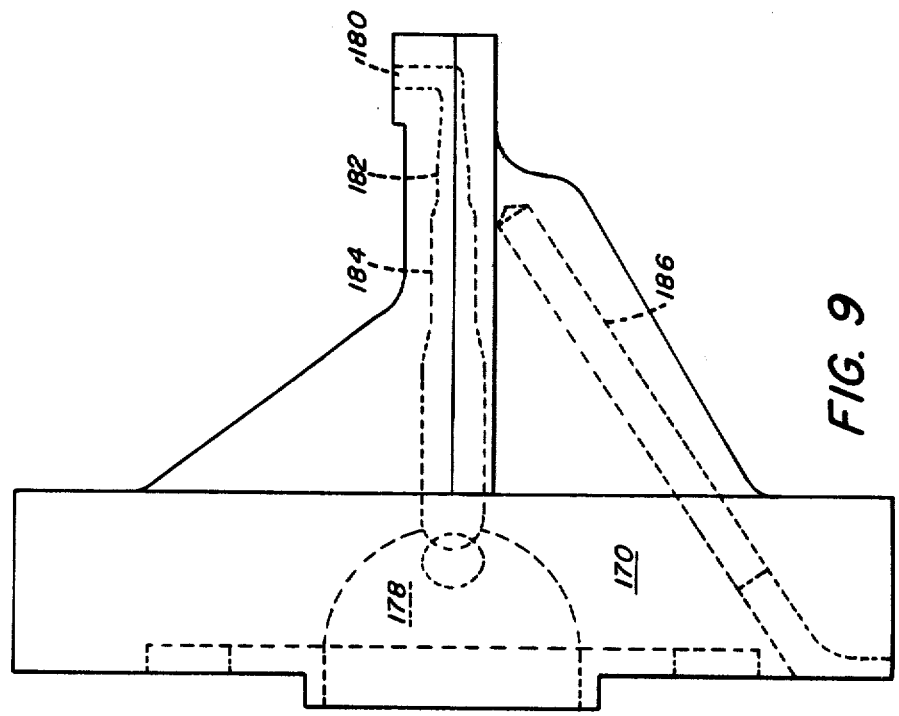
FIG. 9 is an elevation view of the extruder nozzle.

Referring now to FIGS. 8 and 9, the feed plenum 170 has an inlet end 178 which conforms to and is attached to the extruder outlet. The outlet end of the feed plenum comprises an upwardly opening, substantially horizontal, elongated outlet slot 180 having a width substantially equal to the diameter of the injection chambers 118 which are formed in the lower portion of the female die members 114. The outlet slot 180 is formed with a slight curvature conforming to a portion of the path followed by the lower end of the injection chamber 114 as the mold assembly is rotated about base member 10. The length of the feed plenum outlet slot 180 is substantially equal to the distance between similar injection chambers in adjacent mold assemblies 60, i.e. between the two leading injection chambers 118 when more than one injection chamber is associated with each mold assembly. The outlet slot of the feed plenum is supplied by a plurality of conduits 182 which have substantially equal flow areas and lengths, and are supplied by a plurality of intermediate-sized conduits 184 which, in turn, are supplied from the inlet 178 attached to the extruder outlet. The feed plenum is also provided with a plurality of electric heaters 186 which are arranged to maintain the temperature of the feed plenum and the plastic flowing therethrough at a substantially constant temperature.

With this feed plenum construction, the plastic flow from the feed plenum inlet to the outlet slot is substantially uniform throughout, with a substantially constant pressure throughout the length of the outlet slot. Thus, the flow rate over the entire length of the slot is substantially uniform. As a result, as the injection chambers 118 are moved past, or over, the outlet slot 180 of the feed plenum, each injection chamber is provided with a substantially constant, uniform supply of molten thermoplastic at a uniform pressure. In the embodiment illustrated, wherein each mold assembly is provided with two injection chambers, and with the outlet slot having the length set forth above, the outlet slot will be supplying molten plastic to an area equal to the cross-sectional area of two injection chambers. Accordingly, the output required from the extruder, per unit time, is substantially equal to the volume of the injection chambers to be filled for each part to be made, multiplied by the number of injection chambers passing over the outlet slot of the feed plenum during that time. Moreover, so long as the rotational speed of the rotor assembly is constant, the output of the extruder is constant.

Part Removal Conveyor

The part removal conveyor 13 is illustrated in FIGS. 1, 3 and 5 and comprises a substantially endless belt member 190 which is introduced between the open mold members, 114 and 146, at the location in the path of the rotating mold assemblies where the parts have solidified and cured sufficiently to permit the mold to be opened and the parts to be removed therefrom. The conveyor is mounted for horizontal rotation about a vertical axis 191 at one end thereof and is arranged to extend tangentially between the open die members, as shown in FIG. 5. The upper and lower surfaces of the conveyor member 190 are separated and supported in the region between the mold members by plates 192 supported between side rails 193. Thus, the conveyor occupies a relatively small portion of the space between the open die members. The upper surface of the conveyor 190 is arranged to move in the same direction, and at substantially the same speed, as the moving mold assemblies at the point where the parts are ejected from the upper male mold die 148. Inasmuch as the conveyor is moving in the same direction and at the same speed as the mold assemblies and the parts carried thereby, and since the parts are ejected downwardly from the upper die by the ejection pins 140 and are not subject to any gravitational rotating forces, the parts are positioned on the conveyor 190 for removal from the mold apparatus in a substantially uniform, predetermined orientation. The parts may then be transported to the next operation-performing station with this predetermined orientation, substantially eliminating the necessity for reorientating the parts before further operations may be performed thereon, or they may be uniformly packed in containers for storage or shipment without requiring reorientation. In the arrangement illustrated, the parts may be removed from the conveyor by a vertically operating part conveyor (not shown) disposed at the end of the conveyor having axis 191, or the parts may be picked from the surface of the conveyor by any suitable handling apparatus well-known in the art. The support of the conveyor for rotation about the vertical axis 191 permits the conveyor to swing aside, out of the space between the die members, should a malfunction occur in the mold lifting operation whereby a mold is not opened by the time it reaches the part removal conveyor. The conveyor may be provided with a sensor (not shown) which detects an unopened mold ahead of the conveyor location, thereby actuating a conveyor-rotation motor, not shown, or alternatively, the conveyor may be spring-loaded to the normal operating position, with the conveyor being moved aside by contact of the edge thereof with a closed mold assembly.

Operating Cycle

Figure 11:
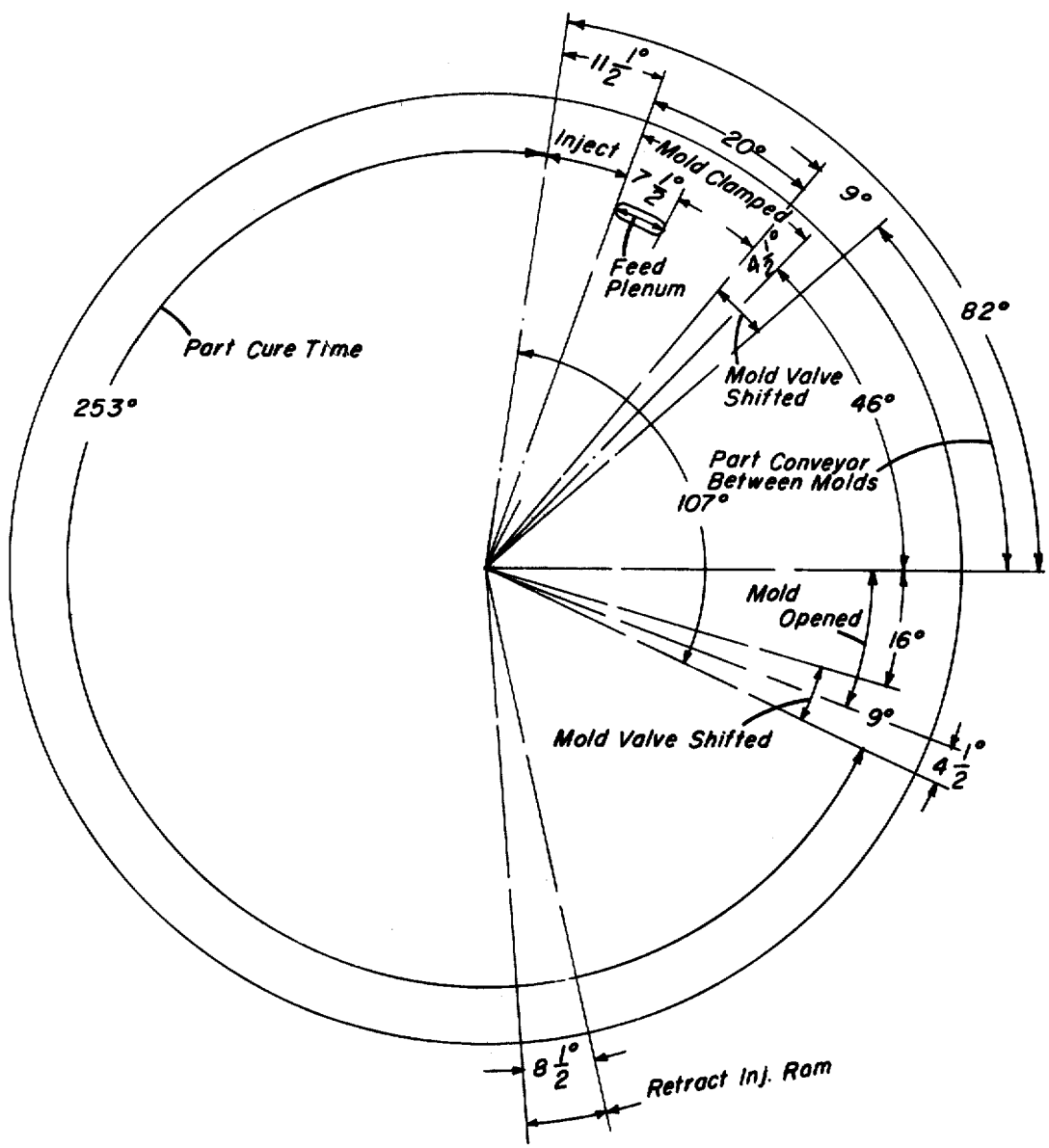
FIG. 11 is a schematic diagram of the operating cycle of the molding apparatus according to a preferred embodiment of the present invention.

A schematic illustration of the operating cycle of the present invention is presented in FIG. 11, showing the relative positions of the occurance of the various operations as a single mold assembly rotates 360° about the rotor axis. It will be understood that the actuation of the respective hydraulic cylinders 124 and 142 is controlled by the stationary cam members 47 and 48 moving the operating levers 164 and 166 of the operating valves 160 and 162. Thus, as the mold assemblies travel about the periphery of the base assembly, the valves are regulated according to the position of the respective cam member at that particular location on the periphery of the apparatus.

As a mold assembly 60 approaches the extruder feed plenum 170, the upper mold member 146 is in the lowermost position, in engagement with the lower mold member 114 with the die members 114 and 148 in mating engagement to form the mold cavity. The ejection pins 150 are in their retracted, upper position and the injection rams 128 are in the lowermost position, leaving the space between the lower support table 112 and the ram bearing 130 completely clear. Thus, the feed plenum 170 is free to engage the lower surface 122 of the die member 114. As the leading injection chamber 118 passes over the first end of the outlet slot 180 in the feed plenum, molten plastic material is fed into the injection chamber at a predetermined pressure and rate whereby the injection chamber is filled with a predetermined volume of plastic by the time it passes over the trailing end of the feed plenum. The same filling procedure occurs with the second injection chamber for the mold assembly. As previously noted, the injection chambers are preferably sized so that the combined capacity of the pair of chambers associated with each mold assembly is slightly greater than the volume of plastic necessary to form the part. As a result, slight variations in the feed rate of the molten plastic from the extruder can be tolerated without resulting in "short shots" or incompletely formed parts. At the same time, the feed rate of the extruder is preferably controlled so that a relatively small amount of excess plastic remains in the injection chamber at the completion of the injection step. Because of the viscosity of the molten plastic and the adhesion between the plastic and the relatively cold walls of the injection chambers the plastic will not run out of the open end of the injection chambers in the short time between moving past the feed plenum and the introduction of the injection rams.

As soon as both of the injection chambers 118 are beyond the outer surface of the feed plenum 170, the injection ram-operating hydraulic cylinder 124 is actuated, driving the rams 128 upwardly into the injection chambers and forcing the molten thermoplastic through the sprue openings 120 into the mold cavity. The plastic in the injection chambers is maintained at the injection pressure until the sprue opening or gate has solidified and then the injection rams are slightly retracted to reduce the residual pressure therein. Thus, the excess plastic in the injection chamber solidifies at a pressure low enough that there is no tendency for the plastic to stick so that it can be readily withdrawn after it has solidified. The rams are then maintained in this position for a predetermined time sufficient to permit the remainder of the molten plastic to solidify. As soon as the part has solidified sufficiently to permit the excess plastic remaining in the injection chamber to be pulled away from the part without damaging the part, the injection ram-operating hydraulic cylinder 124 is actuated to move downwardly, pulling the injection rams 128 down out of the injection chambers 118 and, at the bottom of their travel, forcing the ejector pins 132 upwardly to free the excess plastic from the upper end 138 of the injection ram. The sprue opening 120 is preferably constructed so that the excess plastic is pulled cleanly away from the part, leaving little or no marks thereon which must later be removed, or which could disfigure the part.

Means is provided to enter the space between the mold support table 112 and the injection ram guide 130 between the peripheral location where the rams are fully withdrawn from the injection chamber and the position where the feed plenum engages the lower face of the mold to remove the solidified excess plastic material removed from the injection chamber by the withdrawal of the injection rams. This excess material removal means may simply comprise a scraper blade which extends between the table 112 and scrapes the upper surface of guide 130 to brush the pieces of excess material into a collector adjacent the rotor assembly. The size of the excess material removed is relatively small, permitting the direct introduction of the pieces into the extruder inlet, thereby eliminating the necessity of regrinding the material to permit re-use thereof.

As will be seen by referring to FIG. 11, by this time the mold assembly has rotated through approximately 210° from the position where it first contacted the feed plenum of the plastic extruder. As the mold assembly rotates through approximately a further 45°, the mold lifting hydraulic cylinder 142 is actuated, partially lifting the upper mold 146. At this point the lifted upper mold has rotated to above the part removal conveyor 13. The upper mold is then completely lifted, actuating the ejector pins 150 to disengage the finished part from the upper mold, dropping it onto the upper surface 190 of the part removal conveyor. Immediately after the mold assembly passes beyond the area where the part removal conveyor extends therebetween, the upper mold lifting cylinder 142 is actuated to close and clamp the mold ready to begin the next cycle.

The preferred embodiment of the present invention utilizes a rotor assembly having an outer diameter of approximately 12 feet and incorporates 48 mold assemblies mounted thereon. The rotor assembly is rotated at any speed from 3 to 9 rpm by a 7½ horsepower motor producing between 144 to 432 parts per minute, depending upon the speed of the apparatus. The hydraulic pump supplies the high pressure system with fluid at 1,100 psi and the intermediate system at 625 psi. The molds are clamped for the injection of plastic with a force of 30,000 pounds, and the plastic is injected under a force of 4,000 psi. Thus, the present invention provides apparatus requiring only about 320 square feet of production area which can produce a large quantity of parts with no sprues or gates attached which must later be removed. Moreover, the parts are easily removed from the apparatus in a uniform, predetermined orientation.

While a preferred embodiment of apparatus incorporating the present invention has been described above, it will be appreciated that variations in the apparatus may be accomplished while remaining within the scope of the invention. For example, while the extruder feed plenum has been illustrated and described as feeding vertically upwardly into the injection chambers, it can readily be arranged to feed downwardly into the upper end of an injection chamber in an arrangement wherein the upper mold member is stationary and the bottom mold member is movable. Similarily, an arrangement wherein either of the previously described arrangements for supplying plastic to the injection chamber can be utilized while moving either or both of the mold members between the closed, mold-cavity-forming position and the open position, without significantly altering the operation of the present invention. Likewise, the extruder and feed plenum may be arranged to engage the outer, radial peripheral surface of the mold assembly to supply injection chambers which are arranged to open outwardly through said surface.

While the preferred arrangement has been described as utilizing individual mold assemblies which are removably connected to the outer periphery of the rotor assembly, it will be appreciated that the mold assemblies can be formed as an integral part of the rotor assembly. Thus, the mold assembly base members could be eliminated with a corresponding reduction in the weight of the overall apparatus. Such a modification, however, would increase the complexity of the machining operations necessary since the mold assemblies can no longer be individually adjusted for alignment considerations but must depend upon the maintenance of close tolerances during the fabrication of the rotor member.

The present invention has been described as embodied in a continuous injection molding apparatus having a single operating cycle for each mold assembly during a single revolution of the rotor assembly about its axis. However, should operational considerations dictate, the present invention can be incorporated in apparatus having a complete operating cycle during a rotation of only 180° about the rotor assembly axis. This, of course, requires the use of an additional extruder and an additional part removal conveyor located substantially 180° from the location of those described in the preferred embodiment. Moreover, the cycle-operating cams would have to be modified accordingly. However, by operating the rotor at a speed greater than one-half that contemplated by the preferred embodiment, or by utilizing a thermoplastic material having a significantly shorter cure time, even greater production rates could be accomplished.

The preferred extruder has been described as a continuously operating screw-type which supplies the molten thermoplastic to the feed plenum at a substantially constant flow rate and pressure. However, it is possible to utilize an extruder having a reciprocating screw, of a type well-known in the art, which would provide an intermittent supply of molten thermoplastic to the feed plenum. Thus, the plastic in the feed plenum would be under pressure only at the time when the feed plenum was in engagement with an injection chamber. Likewise, the extruder can be mounted for engagement of the mold assembly in a stationary manner without incorporating the rotation about the axes previously noted.

The operation of the injection ram-operating hydraulic cylinder and the mold closing hydraulic cylinder have been described as controlled by the stationary cam members extending about the periphery of the base assembly. This arrangement is simple, inexpensive, substantially foolproof, and requires relatively little maintenance. Moreover, the use of mechanical cam-operated valves provide absolute timing of the functions of the mold components, being consistent with each of the molds about the periphery of the apparatus, thus consistently making uniform, close tolerance parts. Further, the preferred control does not incorporate components which can "drift" or otherwise alter the adjustment of the timing. However, it will be appreciated that pneumatic, hydraulic or electrical components can easily be substituted for the mechanical controls described, while still remaining within the scope of the present invention. Similarily, the hydraulic system has been described as utilizing high pressure and an intermediate pressure; a single pressure system can easily be used for operating all of the hydraulic cylinders.

The injection rams have been described as incorporating ejector pins which removes the excess plastic therefrom after withdrawal from the injection chambers. However, it will be appreciated that other apparatus, known in the art, can be used in place of the ejector pins to free the excess plastic from the injection rams.

The preferred embodiment of the part removal conveyor utilizes an endless belt for removing the finished parts from between the open mold members; however, it will be appreciated that a rotating table member having a portion of the periphery arranged to pass between the open mold members can be substituted for the endless belt member. It will also be appreciated that more complex part handling conveyors can be arranged to enter between the opened mold members and to receive the parts ejected from the mold in a predetermined orientation which simplifies and expedites further handling of the parts after removal from the mold apparatus.

Accordingly, it will be seen that the present invention provides a continuous thermoplastic injection molding apparatus comprising a multiplicity of pairs of continuously moving, mating die members arranged for movement past a substantially stationary molten thermoplastic supply means. The apparatus is provided with means arranged to inject the molten thermoplastic into the mold cavities while the die members are continuously moving. Further, the present invention provides means arranged for opening the die members in a direction transversely of the direction of continuous movement thereof while they are in motion, thereafter removing the solidified parts from the dies without stopping the dies, and providing a substantially uniform, predetermined orientation to the parts as they leave the injection molding apparatus. As a result of the continuous motion of the assembly comprising the present invention, the complexity and cost thereof is significantly reduced from that which would be incurred by intermittent motion apparatus.

Moreover, the present invention provides an injection molding apparatus which is arranged to permit a single stationary extruder to continuously supply a plurality of moving die cavities with molten thermoplastic with substantially little or no waste thereof.

The present invention also provides an injection molding apparatus wherein the mold members are arranged for movement between the open and closed positions without requiring the use of alignment pins which extend therebetween, restricting or interfering with access to the area between the molds when they are open.

Still further, the present invention provides an injection molding apparatus which is so arranged as to permit the introduction of a conveyor between the open mold members which removes the parts from the molding apparatus in a uniform, predetermined orientation. Thus, the present injection molding apparatus can become an integral part of an assembly line, substantially eliminating the need for additional equipment to reorient the parts before further operations may be performed thereon. Still further, the present invention provides an injection molding apparatus utilizing an injection chamber for supplying the plastic to the mold cavity, which injection chamber is arranged to minimize the amount of excess plastic used over that required to fill the die cavity whereby the excess material may be withdrawn from the injection chamber and introduced directly into the plastic extruder.

Thus, the present invention provides a continuously moving thermoplastic injection molding apparatus which can produce complex, close tolerance parts at a speed not heretofore achieved. Moreover, the apparatus costs significantly less and requires far less production floor space than the prior art apparatus necessary for a comparable production rate. In addition, the present apparatus accomplishes all this while significantly reducing the ancillary equipment necessary to complete the final product production line.

The invention has been described in detail with particular reference to preferred embodiments thereof, but it will be understood that variations and modifications can be effected within the spirit and scope of the invention.

We claim:

1. Continuous plastic injection molding apparatus comprising a plurality of mold assemblies each having a pair of separable mating die members, means arranged to selectively open and close said die members, means forming an injection chamber disposed in cooperating relationship with each pair of die members, said injection chamber opening through a sprue opening into the mold cavity formed between the die members and outwardly through the bottom surface of said injection chamber forming means, means for supplying molten plastic upwardly into said injection chambers through the opening in the bottom surface of the injection chamber, means for causing continuous relative movement between said mold assemblies and injection chambers and said molten plastic supply means about a vertical axis, said plastic being retained in said injection chamber after moving beyond said plastic supply means by frictional engagement of the plastic with the injection chamber, and ram means cooperating with each of said injection chambers arranged for upward movement into said injection chamber to force plastic therein into said mold cavity after said injection chamber and mold assembly have moved beyond said plastic supply means.

2. The invention according to claim 1 wherein said injection ram is arranged to be spaced below the bottom surface of said injection chamber forming means, and said molten plastic supply means being arranged to move in contact with the bottom surface of said injection chamber forming means between said bottom surface and the end of the injection ram.

3. Continuous plastic injection molding apparatus comprising a plurality of mold assemblies each having a pair of separable mating die members, means arranged to selectively open and close said die members, means forming an injection chamber disposed in cooperating relationship with each pair of die members, said injection chamber opening through a sprue opening into the mold cavity formed between the die members and outwardly through an outer surface of said injection chamber forming means, means for supplying molten plastic to said injection chambers, means for causing continuous relative movement between said mold assemblies and injection chambers and said molten plastic supply means, and ram means cooperating with each of said injection chambers arranged to force plastic in said injection chamber into said mold cavity, said injection chamber being substantially unheated whereby excess plastic remaining therein after the mold cavity is filled is solidified at the same time as the material in said mold cavity, said ram means arranged to withdraw said solidified excess plastic from said injection chamber and to space said excess plastic from the outer surface of said injection chamber forming means.

4. The invention according to claim 3 wherein means is provided for removing excess plastic from said ram means after it is spaced from the outer surface of said injection chamber forming means.

5. The invention according to claim 4 including means for introducing said excess plastic as it is removed from said ram means into the inlet of said molten plastic supply means.

6. The invention according to claim 5 wherein said excess plastic is introduced into the inlet of said plastic supply means in the same form that it is removed from said ram means.

* * * * *